(12) United States Patent
Lee et al.

(10) Patent No.: US 7,852,437 B2
(45) Date of Patent: Dec. 14, 2010

(54) DISPLAY DEVICE

(75) Inventors: Hong-Woo Lee, Cheonan-si (KR);
Sang-Youn Han, Cheonan-si (KR);
Jong-Oh Kim, Cheonan-si (KR);
Sang-Yong No, Seoul (KR); Shin-Tack Kang, Seongnam-si (KR); Hyeong-Jun Park, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 11/932,433

(22) Filed: Oct. 31, 2007

(65) Prior Publication Data
US 2008/0100760 A1  May 1, 2008

(30) Foreign Application Priority Data
Oct. 31, 2006  (KR) .................... 10-2006-0106662

(51) Int. Cl.
*G02F 1/1333* (2006.01)
*G02F 1/141* (2006.01)
*G02F 1/13* (2006.01)

(52) U.S. Cl. ...................... 349/108; 349/139

(58) Field of Classification Search ......... 349/106–109, 349/139–152
See application file for complete search history.

(56) References Cited

U.S. PATENT DOCUMENTS

| 4,890,097 A | * | 12/1989 | Yamashita et al. ............ 345/93 |
| RE33,882 E | * | 4/1992 | Morozumi .................... 345/88 |
| 2001/0005254 A1 | * | 6/2001 | Oishi ........................ 349/149 |
| 2006/0120160 A1 | * | 6/2006 | Park et al. ............. 365/185.22 |
| 2006/0203172 A1 | * | 9/2006 | Baek et al. .................. 349/146 |
| 2007/0182909 A1 | * | 8/2007 | Kim et al. ................... 349/149 |
| 2008/0024709 A1 | * | 1/2008 | Moon ......................... 349/139 |

\* cited by examiner

*Primary Examiner*—Rhonda S Peace
(74) *Attorney, Agent, or Firm*—H.C. Park & Associates, PLC

(57) ABSTRACT

In a display device, gate lines, which extend in a first direction, cross and are insulated from data lines, which extend in a second direction, to define pixel areas on a first base substrate. Pixels are arranged in the pixel areas, respectively, and a color filter layer including a plurality of color filter is arranged on a second base substrate that is coupled with the first base substrate. The color filters include a first sub color filter, a second sub color filter, and a third sub color filter, repeatedly arranged in the first direction and the second direction to represent different colors, respectively.

19 Claims, 6 Drawing Sheets

| R | G | B | R |
| B | R | G | B |
| G | B | R | G |
| R | G | B | R |
| B | R | G | B |
| G | B | R | G |

| R | G | B | R |
| B | R | G | B |
| G | B | R | G |
| R | G | B | R |
| B | R | G | B |
| G | B | R | G |

DISPLAY DEVICE

CROSS-REFERENCE TO RELATED APPLICATION

This application claims priority from and the benefit of Korean Patent Application No. 10-2006-0106662, filed on Oct. 31, 2006, which is hereby incorporated by reference for all purposes as if fully set forth herein.

BACKGROUND OF THE INVENTION

1. Field of the Invention

The present invention relates to a display device. More particularly, the present invention relates to a display device that may have improved display quality.

2. Discussion of the Background

In general, a liquid crystal display (LCD) includes an LCD panel to display an image thereon. The LCD panel includes a lower substrate, an upper substrate facing the lower substrate, and a liquid crystal layer interposed between the lower substrate and the upper substrate. The LCD panel also includes a plurality of gate lines, a plurality of data lines, and a plurality of pixels connected to the gate lines and the data lines.

The LCD includes a gate driving circuit to sequentially output a gate pulse to the gate lines and a data driving circuit to output pixel voltages to the data lines. Each of the gate and data driving circuits may be prepared in a chip and arranged on the LCD panel or on a film attached to the LCD panel.

In order to reduce the number of the chips in association with the gate and data driving circuits, an LCD may employ a gate-IC-less (GIL) structure in which the gate driving circuit is formed directly on the lower substrate through a thin film forming process. In an LCD having the GIL structure, the gate driving circuit includes a shift register in which plural stages are connected to each other one after another.

In order to reduce the number of the data driving chips in an LCD having the GIL structure, a configuration that reduces the number of the data lines has been developed. In this configuration, three pixels are successively arranged in the direction in which the data lines extend to define one pixel that displays one color. Red, green, and blue color filters included in a color filter layer are successively arranged in the direction in which the data lines extend and extend in the direction in which the gate lines extend so as to each have a stripe shape.

However, this configuration may cause a horizontal line defect in the LCD and therefore, the display quality of the LCD may deteriorate.

SUMMARY OF THE INVENTION

The present invention provides a display device that may have improved display quality.

Additional features of the invention will be set forth in the description which follows, and in part will be apparent from the description or may be learned by practice of the invention.

The present invention discloses a display device including a first base substrate, a line part, a plurality of pixels, a second base substrate, a color filter layer, and a common electrode. The line part includes a plurality of gate lines, which extend in a first direction, disposed on the first base substrate and a plurality of data lines, which extend in a second direction, crossing and insulated from the gate lines. The gate lines and the data lines define a plurality of pixel areas disposed on the first base substrate. A pixel is arranged in each pixel area, and each pixel area includes a thin film transistor connected to a corresponding data line and a corresponding gate line and a pixel electrode connected to the thin film transistor. The second base substrate faces the first base substrate, and the color filter layer including a plurality of color filters is arranged on the second base substrate. The color filters correspond to the pixels in a one-to-one fashion. The common electrode is arranged on one of the first base substrate and the second base substrate. Each of the pixels comprises a horizontal pixel structure in which a length in the first direction is longer than a length in the second direction, the pixels are divided into a plurality of pixel columns, each column comprising three pixels successively arranged in the second direction, the three pixels are connected to three gate lines successively arranged among the gate lines, respectively, and at least two pixels included in one pixel column of the pixel columns are alternately connected to two data lines adjacent to each other among the data lines. The color filters comprise a first sub color filter, a second sub color filter, and a third sub color filter, repeatedly arranged in the first direction and the second direction to represent different colors, respectively.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
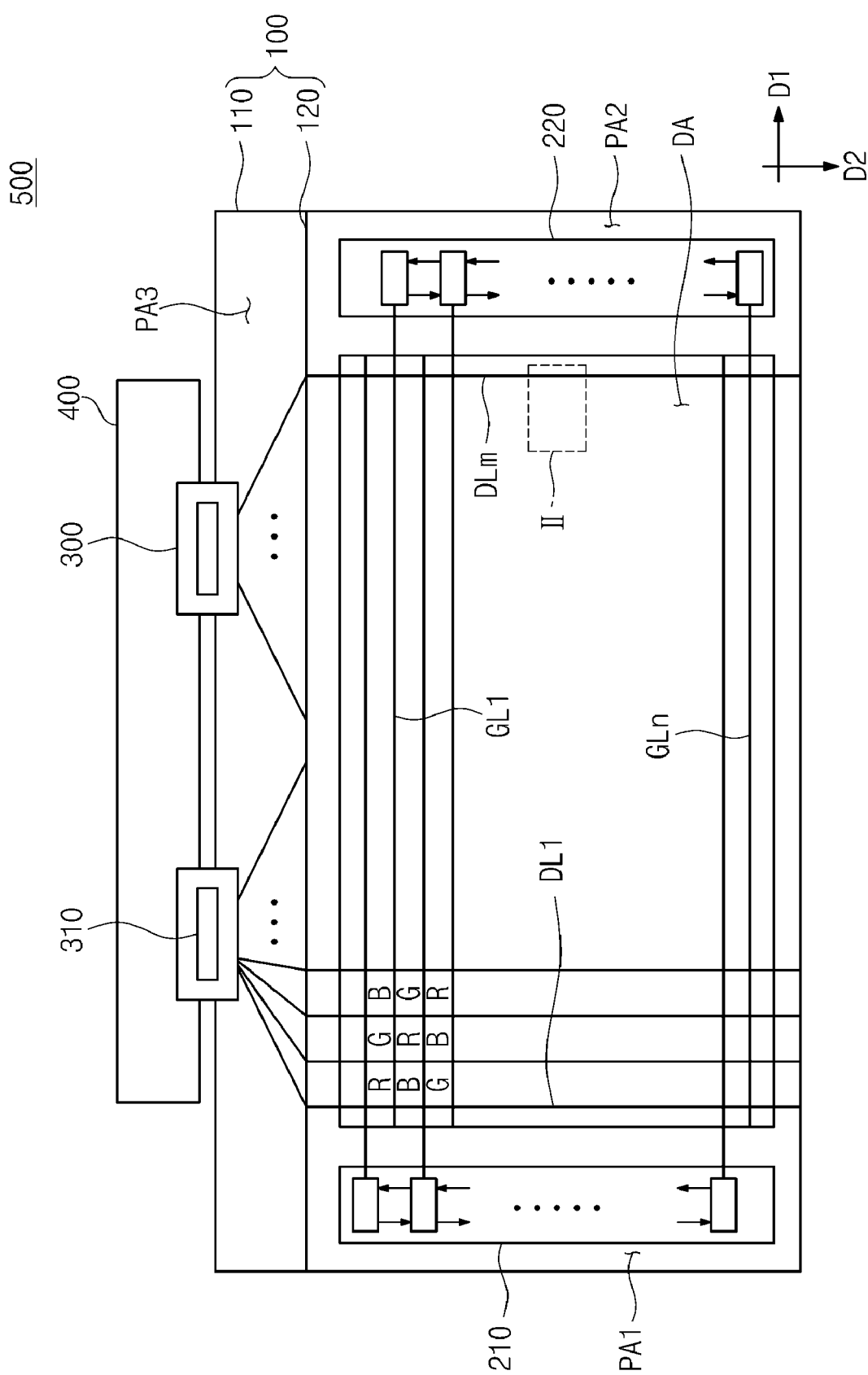
FIG. 1 is a plan view showing an LCD according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
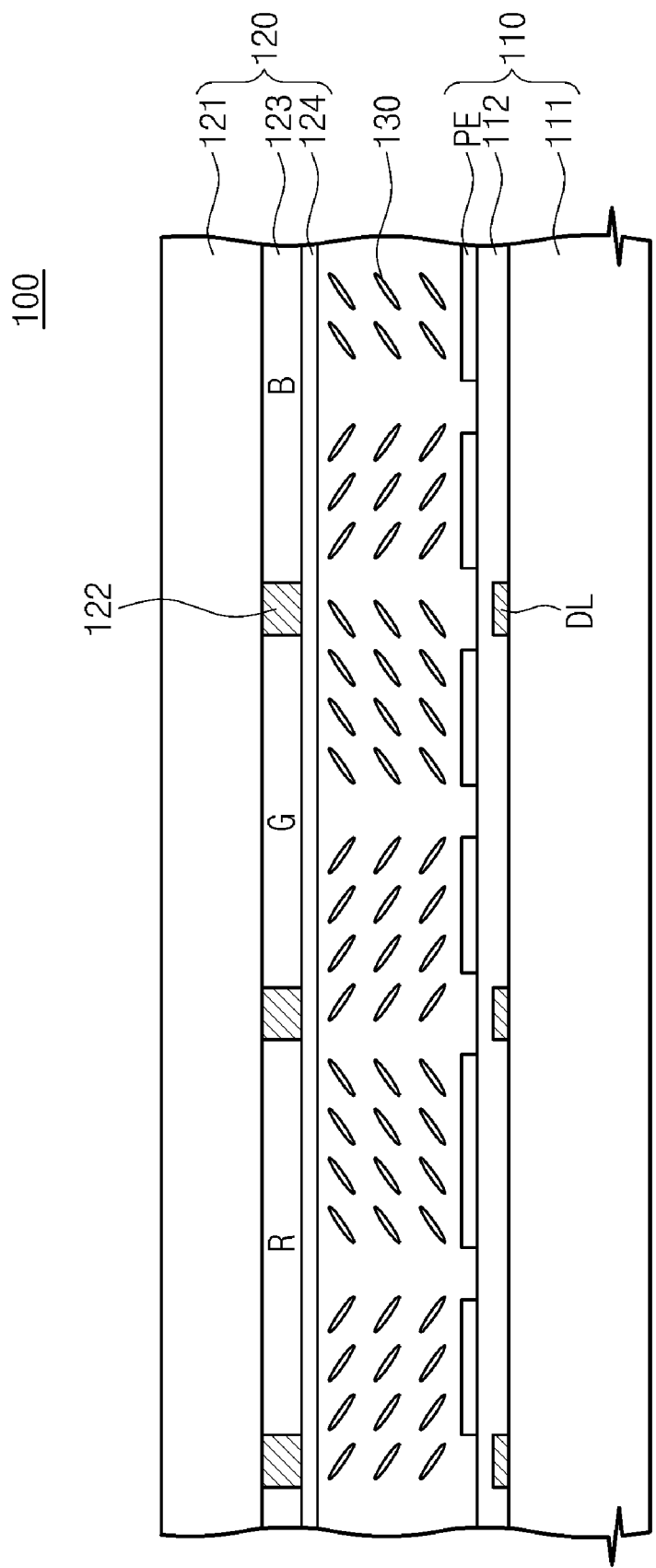
FIG. 2 is a partial cross-sectional view showing the LCD panel of FIG. 1.

FIG. 1 is a plan view showing an LCD according to an exemplary embodiment of the present invention. FIG. 2 is a partial cross-sectional view showing the LCD panel of FIG. 1.

Referring to FIG. 1 and FIG. 2, the LCD 500 includes an LCD panel 100 to display an image, a printed circuit board 400 arranged adjacent to the LCD panel 100, and tape carrier packages 300 connecting the printed circuit board 400 to the LCD panel 100.

The LCD panel 100 includes an array substrate 110, an opposite substrate 120 facing the array substrate 110, and a liquid crystal layer 130 interposed between the array substrate 110 and the opposite substrate 120. The array substrate 110 is divided into a display region DA to display the image and first, second, and third peripheral regions PA1, PA2, and PA3 adjacent to the display region DA.

The array substrate 110 includes a plurality of pixels arranged in the display region DA in a matrix. The display region DA is divided into pixel areas defined by a plurality of gate lines GL1~GLn extending in a first direction D1 and a plurality of data lines DL1~DLm extending in a second direction D2 substantially perpendicular to the first direction D1. The pixels are arranged in the pixel areas in a one-to-one fashion. The gate lines GL1~GLn and the data lines DL1~DLm are arranged on a first base substrate 111. The array substrate 110 may further include an insulation layer 112 formed on the first base substrate 111 to cover the gate lines GL1~GLn and the data lines DL1~DLm. Pixel electrodes PE may be arranged on the insulation layer 112 corresponding to the pixel areas, respectively.

The opposite substrate 120 includes a second base substrate 121 facing the first base substrate 111, a color filter layer 123 having a plurality of color filters corresponding to the pixel areas, respectively, a black matrix 122 disposed between the color filters, and a common electrode 124 arranged on the color filter layer 123 and the black matrix 122. In the present exemplary embodiment, the color filters may include a red color filter R, a green color filter G, and a blue color filter B.

The LCD 500 may further include a first gate driving circuit 210, a second gate driving circuit 220, and data driving chips 310. The first gate driving circuit 210 may be arranged in the first peripheral region PA1 adjacent to first ends of the gate lines GL1~GLn to sequentially output a first gate signal. The first gate driving circuit 210 may include a first shift register in which odd-numbered stages are coupled to each other one after another. Output terminals of the odd-numbered stages may be connected to the first ends of odd-numbered gate lines among the gate lines GL1~GLn, respectively. Therefore, the odd-numbered stages may be sequentially turned on to apply the first gate signal to the odd-numbered gate lines. Although not shown in FIG. 1, the first shift register may further include a first dummy stage to control the last stage among the odd-numbered stages.

A second gate driving circuit 220 may be arranged in the second peripheral region PA2 adjacent to second ends of the gate lines GL1~GLn and may sequentially output a second gate signal. The second gate driving circuit 220 may include a second shift register in which even-numbered stages are coupled to each other one after another. Output terminals of the even-numbered stages may be connected to the second ends of even-numbered gate lines among the gate lines GL1~GLn, respectively. Therefore, the even-numbered stages may be sequentially turned on to apply the second gate signal to the even-numbered gate lines. Although not shown in FIG. 1, the second shift register may further include a second dummy stage to control the last stage among the even-numbered stages.

In the present exemplary embodiment, the first and second gate driving circuits 210 and 220 may be directly formed on the array substrate 110 through a thin film process applied to form the pixels. Since the first and second gate driving circuits 210 and 220 may be directly formed on the array substrate 110, the chips in which the first and second gate driving circuits 210 and 220 are installed may be removed from the LCD 500, which may improve the productivity of the LCD 500 and reduce the size of the LCD 500.

First ends of the tape carrier packages 300 may be attached to the third peripheral region PA3 adjacent to first ends of the data lines DL1~DLm, and second ends of the tape carrier packages 300 may be attached to the printed circuit board 400. The data driving chips 310 may be mounted on the tape carrier packages 300, respectively, to apply a data voltage to the data lines DL1~DLm. Therefore, the data driving chips 310 may apply the data voltage to the data lines DL1~DLm in response to a data control signal from the printed circuit board 400.

Also, the printed circuit board 400 may output a first gate control signal and a second gate control signal, which are applied to the first and second gate driving circuits 210 and 220, respectively, through the tape carrier packages 300. Thus, the first gate driving circuit 210 may apply the first gate signal to the odd-numbered gate lines in response to the first gate control signal, and the second gate driving circuit 220 may apply the second gate signal to the even-numbered gate lines in response to the second gate control signal.

As shown in FIG. 1, the pixels arranged on the array substrate 110 may have a horizontal pixel structure in which the length in the first direction D1 is longer than the length in the second direction D2. In the horizontal pixel structure, three pixels successively arranged in the second direction D2 may be defined as a display pixel to display one color and may correspond to red, blue, and green color filters R, B, and G, respectively. The number of data lines with horizontal pixel structures is less than that with vertical pixel structures in which the length in the first direction D1 is shorter than the length in the second direction D2, but the number of the gate lines is greater.

In the LCD 500 employing the horizontal pixel structure, the number of data driving chips decreases as the number of data lines decreases, so the productivity of the LCD 500 may improve. Additionally, although the number of the gate lines is greater in the LCD 500 adopting the horizontal pixel structure, the first and second gate driving circuits 210 and 220 may be directly formed on the array substrate 110 through a thin film process, so the number of driving chips included in the LCD 500 may not increase.

Figure 3:
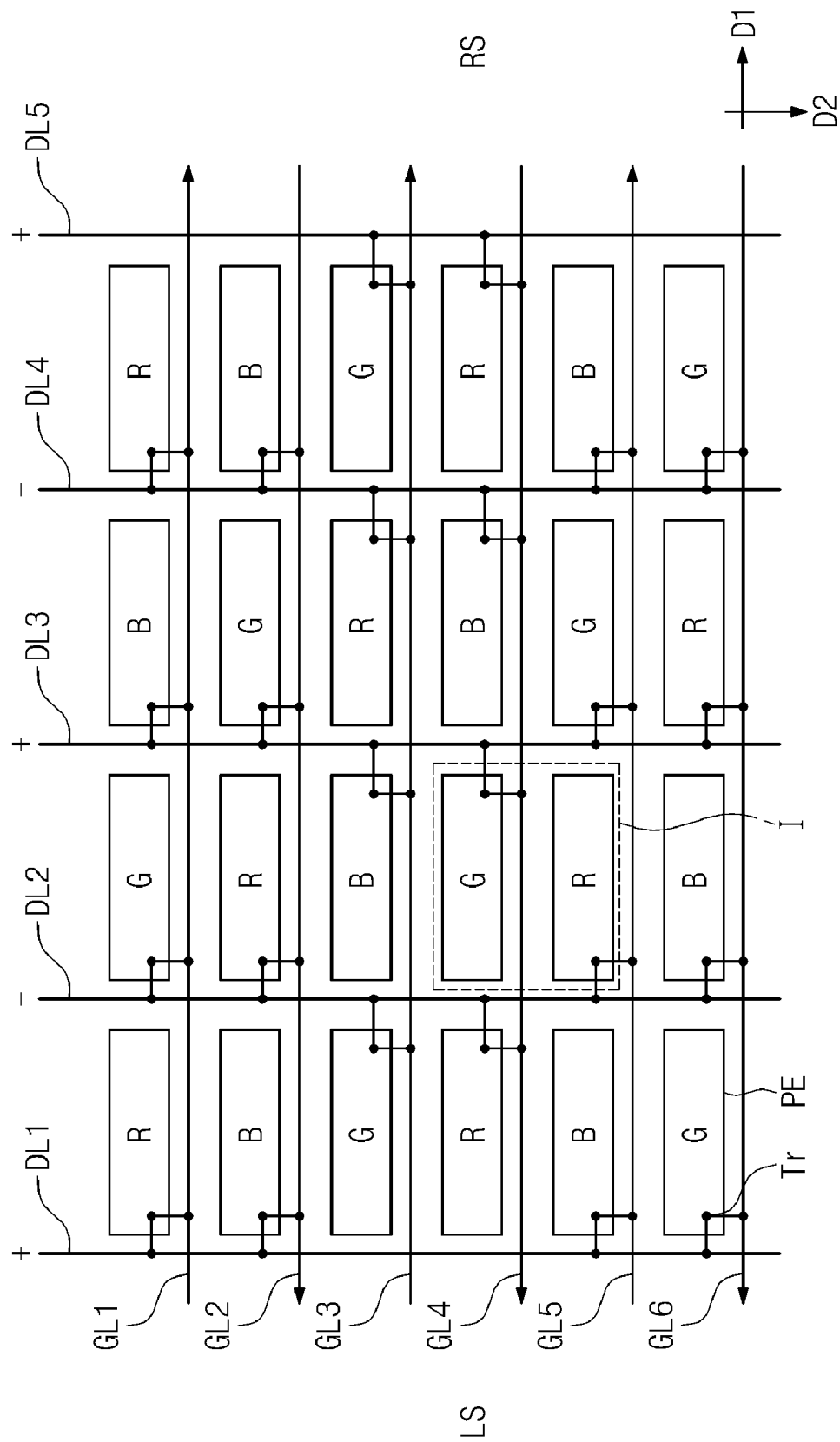
FIG. 3 is a partially enlarged plan view showing the LCD panel of FIG. 1.

FIG. 3 is a partially enlarged plan view showing the LCD panel of FIG. 1.

Referring to FIG. 3, the array substrate 110 (shown in FIG. 1) of the LCD panel 100 (shown in FIG. 1) includes gate lines GL1~GL6, data lines DL1~DL5, and pixels.

The pixels may be arranged in the pixel areas in a one-to-one fashion. The pixel areas are defined in a matrix by the gate lines GL1~GL6 and the data lines DL1~DL5. Each pixel includes a thin film transistor Tr and a pixel electrode PE. The thin film transistor Tr may be connected to a corresponding gate line and a corresponding data line, and an output electrode of the thin film transistor Tr may be connected to the pixel electrode PE.

In the present exemplary embodiment, the adjacent pairs of pixels included in one pixel column may be alternately connected to a left data line arranged at a left side LS of the pixel column and a right data line arranged at a right side RS of the pixel column. Also, data voltages having different polarities with respect to a reference voltage may be applied to the left and right data lines, respectively. As a result, the LCD 500 may be driven in a 2×1 dot inversion driving mode.

The first gate signal may be applied to first ends of the odd-numbered gate lines GL1, GL3, and GL5 among the gate lines GL1~GL6, and the second gate signal may be applied to second ends of the even-numbered gate lines GL2, GL4, and GL6 among the gate lines GL1~GL6.

The color filter layer 123 (shown in FIG. 2) may be arranged on the opposite substrate 120 (shown in FIG. 1) of the LCD panel 100 and may include the color filters corresponding to the pixels in a one-to-one fashion.

In FIG. 3, the display pixel displaying one color includes three pixels successively arranged in the second direction D2 in which the data lines DL1~DL5 extend. The three pixels may define a display pixel and may be sequentially turned on by a ⅓ period of an active period during which the display pixel is turned on. As shown in FIG. 3, there may be three different colors of color filters. In the present exemplary embodiment, the color filter layer 123 includes red, green, and blue color filters R, G, and B, and the color filters R, G, and B may be arranged in a repeating order i.e. red, blue, green, along the second direction D2.

Also, the color filters successively arranged in the first direction D1 in which the gate lines GL1~GL6 extend may have different colors. In the present exemplary embodiment, the color filters R, G, and B may be arranged in a repeating order, i.e. red, green, blue, along the first direction D1. Thus, when viewed in a plan view, the color filters may be arranged on the LCD panel 100 in an island shape.

Figure 4:
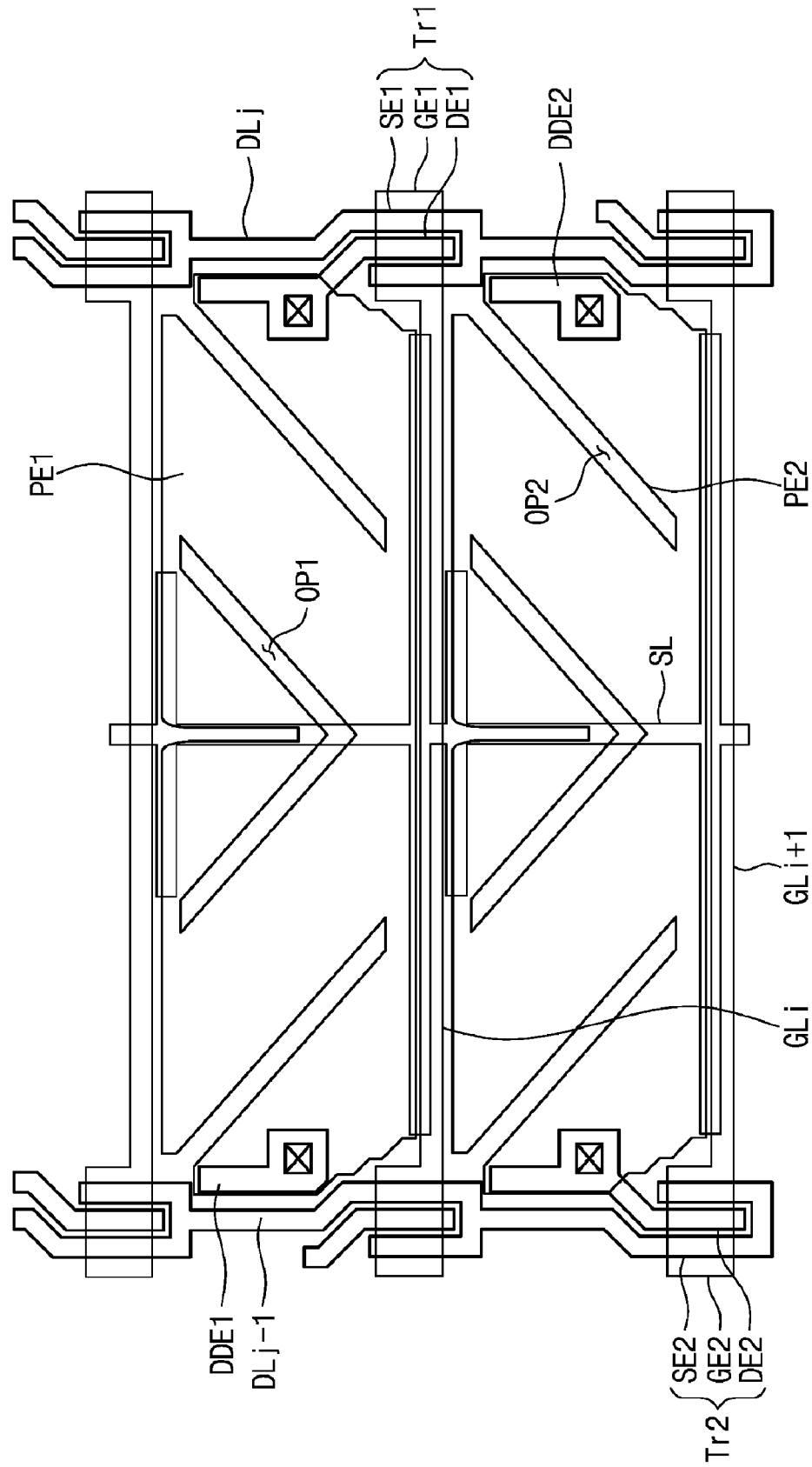
FIG. 4 is a layout diagram showing portion "I" of the array substrate shown in FIG. 3.

FIG. 4 is a layout diagram showing portion "I" of the array substrate shown in FIG. 3.

Referring to FIG. 4, the array substrate 110 includes a $(j-1)^{th}$ data line DLj-1, a $j^{th}$ data line DLj, an $i^{th}$ gate line GLi, an $(i+1)^{th}$ gate line GLi+1, an $(i \times j)^{th}$ pixel, and an $(i+1) \times (j-1)^{th}$ pixel.

The $(j-1)^{th}$ data line DLj-1 is arranged at a left side of the $(i \times j)^{th}$ pixel and the $(i+1) \times (j-1)^{th}$ pixel, and the $j^{th}$ data line DLj is arranged at a right side of the $(i \times j)^{th}$ pixel and the $(i+1) \times (j-1)^{th}$ pixel.

The $(i \times j)^{th}$ pixel may be connected to the i-th gate line GLi and the $j^{th}$ data line DLj, and the $(i+1) \times (j-1)^{th}$ pixel may be connected to the $(i+1)^{th}$ gate line GLi+1 and the $(j-1)^{th}$ data line DLj-1.

The $(i \times j)^{-th}$ pixel may include a first thin film transistor Tr1 and a first pixel electrode PE1. The first thin film transistor Tr1 may include a first gate electrode GE1 branched from the $i^{th}$ gate line GLi, a first source electrode SE1 branched from the $j^{th}$ data line DLj, and a first drain electrode DE1 connected to the first pixel electrode PE1 and spaced apart from the first source electrode SE1 above the first gate electrode GE1.

The first thin film transistor Tr1 may be arranged adjacent to the $j^{th}$ data line DLj, and the first drain electrode DE1 may extend parallel to the $j^{th}$ data line DLj. The first drain electrode DE1 may overlap a right side end portion of the first pixel electrode PE1 adjacent to the $j^{th}$ data line DLj, so that the first pixel electrode PE1 and the first drain electrode DE1 are connected to each other at a point adjacent to the $j^{th}$ data line DLj.

The $(i \times j)^{th}$ pixel may further include a first dummy drain electrode DDE1. The first dummy drain electrode DDE1 may be arranged adjacent to the $(j-1)^{th}$ data line DLj-1 and may extend parallel to the $(j-1)^{th}$ data line DLj-1. The first dummy drain electrode DDE1 may overlap a left side end portion of the first pixel electrode PE1 adjacent to the $(j-1)^{-th}$ data line DLj-1, so that the first pixel electrode PE1 and the first dummy drain electrode DDE1 are connected to each other at a point adjacent to the $(j-1)^{th}$ data line DLj-1.

The first dummy drain electrode DDE1 may have the same structure as the portion of the first drain electrode DE1 that overlaps the first pixel electrode PE1. Therefore, the first dummy drain electrode DDE1 may reduce the difference between a parasitic capacitance formed between the first pixel electrode PE1 and the $j^{th}$ data line DLj and a parasitic capacitance formed between the first pixel electrode PE1 and the $(j-1)^{th}$ data line DLj-1.

The first pixel electrode PE1 may provide a first opening OP1 formed therethrough to divide the $(i \times j)^{th}$ pixel area, in which the $(i \times j)^{th}$ pixel is arranged, into a plurality of domains in which liquid crystal molecules may be aligned in different directions. In the present exemplary embodiment, the $(i \times j)^{th}$ pixel area is divided into six domains by the first opening OP1.

The $(i+1) \times (j-1)^{th}$ pixel may include a second thin film transistor Tr2 and a second pixel electrode PE2. The second thin film transistor Tr2 may have a second gate electrode GE2 branched from the $(i+1)^{th}$ gate line GLi+1, a second source electrode SE2 branched from the $(j-1)^{th}$ data line DLj-1, and a second drain electrode DE2 connected to the second pixel electrode PE2 and spaced apart from the second source electrode SE2 above the second gate electrode GE2.

The second thin film transistor Tr2 may be arranged adjacent to the $(j-1)^{th}$ data line DLj-1, and the second drain electrode DE2 may extend parallel to the $(j-1)^{th}$ data line DLj-1. The second drain electrode DE2 may overlap a left side end portion of the second pixel electrode PE2 adjacent to the $(j-1)^{th}$ data line DLj-1, so that the second pixel electrode PE2 and the second drain electrode DE2 are connected to each other at a point adjacent to the $(j-1)^{th}$ data line DLj-1.

The $(i+1) \times (j-1)^{th}$ pixel further includes a second dummy drain electrode DDE2. The second dummy drain electrode DDE2 may be arranged adjacent to the $j^{th}$ data line DLj and may extend parallel to the $j^{th}$ data line DLj. The second dummy drain electrode DDE2 may overlap a right side end portion of the second pixel electrode PE2 adjacent to the $j^{th}$ data line DLj, so that the second pixel electrode PE2 and the second dummy drain electrode DDE2 may be connected to each other at a point adjacent to the $j^{th}$ data line DLj.

The second dummy drain electrode DDE2 may have the same structure as the portion of the second drain electrode DE2 that overlaps the second pixel electrode PE2. Therefore, the second dummy drain electrode DDE2 may reduce the difference between a parasitic capacitance formed between the second pixel electrode PE2 and the $(j-1)^{th}$ data line DLj-1 and a parasitic capacitance formed between the second pixel electrode PE2 and the $j^{th}$ data line DLj.

The second pixel electrode PE2 may provide a second opening OP2 formed therethrough to divide the $(i+1) \times (j-1)^{th}$ pixel area, in which the $(i+1) \times (j-1)^{th}$ pixel is arranged, into a plurality of domains in which liquid crystal molecules may be aligned in different directions. In the present exemplary embodiment, the $(i+1) \times (j-1)^{th}$ pixel area is divided into six domains by the second opening OP2.

The array substrate 110 may further include a storage line SL. The storage line SL may partially overlap the first pixel electrode PE1 arranged in the $(i \times j)$ pixel area and the second pixel electrode PE2 arranged in the $(i+1) \times (j-1)^{th}$ pixel area. As a result, the storage line SL and the first pixel electrode PE1 may define a first storage capacitor, and the storage line SL and the second pixel electrode PE2 may define a second storage capacitor.

Figure 5:
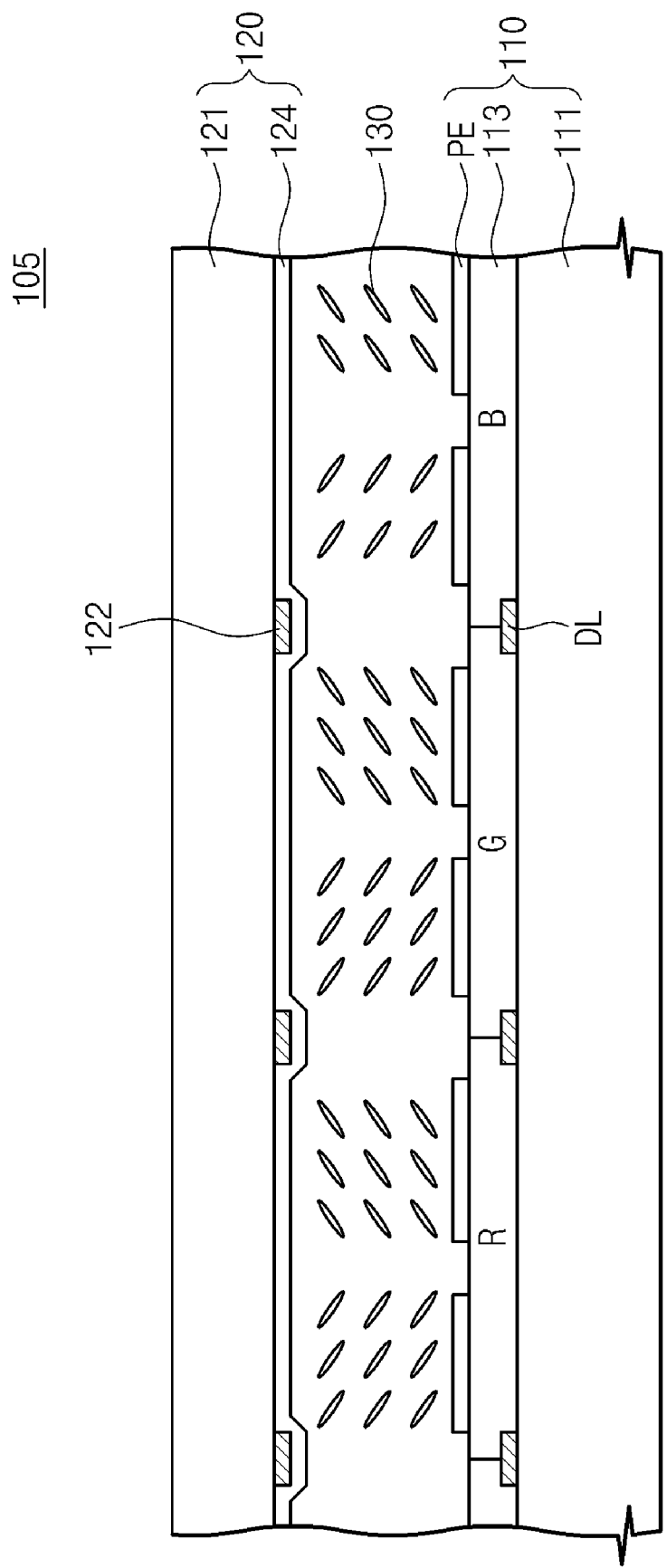
FIG. 5 is a partial cross-sectional view showing an LCD according to another exemplary embodiment of the present invention.

FIG. 5 is a partial cross-sectional view showing an LCD panel according to another exemplary embodiment of the present invention.

Referring to FIG. 5, an LCD panel 105 may include a color filter layer 113 arranged on the array substrate 110.

In particular, the array substrate 110 may include a color filter layer 113 having a plurality of color filters instead of the insulation layer shown in FIG. 2. In the present exemplary embodiment, the color filter layer 113 includes red, green, and blue color filters R, G, and B. The pixel electrodes PE may be arranged on the color filter layer 113 corresponding to the pixel areas in a one-to-one fashion.

The color filter layer 123 (shown in FIG. 2) is omitted from the opposite substrate 120 facing the array substrate 110, and the black matrix 122 and the common electrode 124 are arranged on the opposite substrate 120.

Figure 6A:
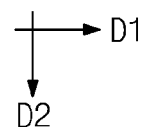
FIG. 6A is a plan view showing a luminance difference caused by a delay of a gate signal in portion "II" shown in FIG. 1.
Figure 6B:
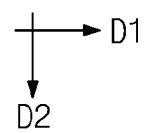
FIG. 6B is a plan view showing a luminance difference caused by a parasitic capacitance between a data line and a pixel electrode in portion "II" shown in FIG. 1.

FIG. 6A is a plan view showing a luminance difference due to a delay of a gate signal in portion "II" shown in FIG. 1. FIG. 6B is a plan view showing a luminance difference by a parasitic capacitance between a data line and a pixel electrode in portion "II" shown in FIG. 1.

Referring to FIG. 6A, a horizontal line defect occurs in portion "II" adjacent to the second gate driving circuit 220 of the LCD panel 100 due to the delay of the first gate signal.

In particular, odd-numbered pixel rows may have a lower charging rate than the even-numbered pixel rows in an area adjacent to the second gate driving circuit due to the delay of the first gate signal. Therefore, the odd-numbered pixel rows may have lower luminance than the even-numbered pixel rows, so a luminance difference may arise in the area adjacent to the second gate driving circuit at every pixel row.

Although not shown in figures, the even-numbered pixel rows may have a lower charging rate than the odd-numbered pixel rows in an area adjacent to the first gate driving circuit due to the delay of the second gate signal. Therefore, the even-numbered pixel rows may have lower luminance than the odd-numbered pixel rows, so a luminance difference may occur between an odd-numbered pixel row and an even-numbered pixel row in an area adjacent to the first gate driving circuit.

However, the red, green, and blue pixels R, G, and B may be successively and repeatedly arranged in the first and second directions D1 and D2. Thus, when viewed in a plan view, the pixels may be represented in various states, such as brighter or darker red pixels, brighter or darker green pixels, and brighter or darker blue pixels, on the LCD panel 100. Since human eyes may have high sensitivity with regard to any regularly-repeated phenomenon, when the color filters are arranged in an island shape, the regularity of the luminance difference may be removed. As a result, a horizontal line defect that may arise from the delay of the first and second signals may be not visible to the naked eye due to a dithering effect, which may improve the display quality of the LCD panel 100.

Referring to FIG. 6B, the pixel electrode arranged on the array substrate may be shifted to the left or right side with respect to the data line while manufacturing the LCD panel.

When the pixel electrode is shifted to the left side with respect to the data line, a parasitic capacitance formed between the pixel electrode and the left data line of the pixel electrode may be greater than a parasitic capacitance formed between the pixel electrode and the right data line of the pixel electrode. In general, a kick-back voltage increases as the parasitic capacitance increases, so the data voltage applied to the pixel electrode may decrease.

As the described above, when the pixel electrode is shifted to the left side with respect to the data line, two pixel rows connected to the left data line may have a lower luminance than two pixel rows connected to the right data line. Therefore, when viewed in a plan view, a luminance difference may occur in every two pixel rows.

On the other hand, when the pixel electrode is shifted to the right side with respect to the data line, the parasitic capacitance formed between the pixel electrode and the right data line of the pixel electrode may be greater than the parasitic capacitance formed between the pixel electrode and the left data line of the pixel electrode. Thus, two pixel rows connected to the left data line may have a lower luminance than that of two pixel rows connected to the right data line. Consequently, a luminance difference may occur on the LCD panel between pairs of pixel rows.

However, the red, green, and blue pixels R, G, and B may be successively and repeatedly arranged in the first direction D1, and the red, blue, and green pixels R, B, and G may be successively and repeatedly arranged in the second direction D2. Thus, when viewed in a plan view, the pixels may be represented in various states, such as brighter or darker red pixels, brighter or darker green pixels, and brighter or darker blue pixels, on the LCD panel. Consequently, a horizontal line defect that may arise from the parasitic capacitance may be not visible to the naked eye due to the dithering effect, which may improve the display quality of the LCD panel.

According to the above, three consecutive pixels may be successively arranged in the direction in which the data lines extend to define one display pixel to display one color. The three consecutive pixels may be sequentially turned on by a ⅓ period of an active period during which the display pixel is turned on. The color filters, each of which has a different color, correspond to the three consecutive pixels, respectively. Also, the three consecutive pixels may be arranged in the direction in which the gate lines extend and correspond to the color filters having different colors, respectively.

Therefore, although a luminance difference may occur between every pixel row or between every pair of pixel rows, since the color filters are arranged in the LCD panel in the island shape, the horizontal line defect may be prevented due to a dithering effect caused by the color filters being arranged in the LCD panel in an island shape. As a result, the display quality of the LCD may be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
 a first base substrate;
 a line part comprising a plurality of gate lines, which extend in a first direction, disposed on the first base substrate and a plurality of data lines, which extend in a second direction, crossing and insulated from the gate lines to define a plurality of pixel areas disposed on the first base substrate;
 a plurality of pixels arranged in the pixel areas, respectively;
 a second base substrate facing the first base substrate;
 a color filter layer arranged on one of the first base substrate and the second base substrate and comprising a plurality of color filters corresponding to the pixels in a one-to-one fashion; and
 a common electrode arranged on one of the first base substrate and the second base substrate, wherein each of the pixels comprises a horizontal pixel structure in which a length in the first direction is longer than a length in the second direction, the pixels are divided into a plurality of pixel columns, each column comprising three pixels successively arranged in the second direction, the three pixels are connected to three gate lines successively arranged among the gate lines, respectively, at least two pixel pairs included in one pixel column of the pixel columns are alternatively connected to two data lines adjacent to each other among the data lines, and the color filters comprise a first sub color filter, a second sub color filter, and a third sub color filter, repeatedly arranged in the first direction and the second direction to represent different colors, respectively.

2. The display device of claim 1, wherein the first sub color filter, the second sub color filter, and the third sub color filter in the second direction are a red color filter, a blue color filter, and a green color filter, respectively.

3. The display device of claim 1, wherein the first sub color filter, the second sub color filter, and the third sub color filter in the first direction are a red color filter, a green color filter, and a blue color filter, respectively.

4. The display device of claim 1, wherein a first pixel among the three pixels is connected to a first gate line among the three gate lines, a second pixel among the three pixels is connected to a second gate line among the three gate lines, a third pixel among the three pixels is connected to a third gate line among the three gate lines, and the first pixel, the second pixel, and the third pixel are sequentially turned on by a ⅓ period of an active period during which the three pixels are turned on.

5. The display device of claim 4, wherein a first data line of the two data lines is arranged at a left side of the pixel column and a second data line of the two data lines is arranged at a right side of the pixel column.

6. The display device of claim 5, wherein each of the first pixel, the second pixel, and the third pixel comprises a thin film transistor connected to a corresponding data line and a corresponding gate line and a pixel electrode connected to the thin film transistor.

7. The display device of claim 6, wherein the thin film transistor comprises a gate electrode branched from the corresponding gate line, a source electrode branched from the corresponding data line, and a drain electrode connected to the pixel electrode and spaced apart from the source electrode above the gate electrode.

8. The display device of claim 7, wherein when the corresponding data line is the first data line, the thin film transistor is arranged adjacent to the first data line, and the drain electrode and the pixel electrode are connected to each other at a point adjacent to the first data line.

9. The display device of claim 8, wherein each of the first pixel, the second pixel, and the third pixel comprises a dummy drain electrode connected to the pixel electrode, and the dummy drain electrode comprises the same structure as a portion of the drain electrode.

10. The display device of claim 9, wherein in two pixels of the first pixel, the second pixel, and the third pixel, the dummy drain electrode is arranged closer to the second data line than the first data line, and the dummy drain electrode and the pixel electrode are connected to each other at a point adjacent to the second data line.

11. The display device of claim 7, wherein when the corresponding data line is the second data line, the thin film transistor is arranged adjacent to the second data line, and the drain electrode and the pixel electrode are connected to each other at a point adjacent to the second data line.

12. The display device of claim 11, wherein each of the first pixel, the second pixel, and the third pixel further comprises a dummy drain electrode connected to the pixel electrode, and the dummy drain electrode comprises the same structure as a portion of the drain electrode.

13. The display device of claim 12, wherein in two pixels of the first pixel, the second pixel, and the third pixel, the dummy drain electrode is arranged closer to the first data line than the second data line, and the dummy drain electrode and the pixel electrode are connected to each other at a point adjacent to the first data line.

14. The display device of claim 5, wherein data voltages having different polarities from each other with respect to a reference voltage are applied to the first data line and the second data line, respectively.

15. The display device of claim 14, wherein the pixels are driven in a 2×1 dot inversion driving mode.

16. The display device of claim 14, wherein the reference voltage is a common voltage applied to the common electrode.

17. The display device of claim 1, further comprising:
a first gate driving circuit to sequentially provide a gate signal to odd-numbered gate lines among the gate lines; and
a second gate driving circuit to sequentially provide the gate signal to even-numbered gate lines among the gate lines.

18. The display device of claim 17, wherein the first gate driving circuit is arranged adjacent to first ends of the gate lines, and the second gate driving circuit is arranged adjacent to second ends of the gate lines.

19. The display device of claim 17, wherein the first gate driving circuit and the second gate driving circuit are directly formed on the first base substrate.

* * * * *